(12) United States Patent
Hutchinson

(10) Patent No.: US 8,459,909 B2
(45) Date of Patent: Jun. 11, 2013

(54) MOTORCYCLE TRANSPORTATION RESTRAINT SYSTEM

(76) Inventor: Quinton Renshaw Hutchinson, Sydney (AU)

( * ) Notice: Subject to any disclaimer, the term of this patent is extended or adjusted under 35 U.S.C. 154(b) by 144 days.

(21) Appl. No.: 12/674,314

(22) PCT Filed: Aug. 20, 2008

(86) PCT No.: PCT/AU2008/001219
§ 371 (c)(1),
(2), (4) Date: Jun. 29, 2010

(87) PCT Pub. No.: WO2009/023921
PCT Pub. Date: Feb. 26, 2009

(65) Prior Publication Data
US 2011/0064534 A1   Mar. 17, 2011

(30) Foreign Application Priority Data

Aug. 20, 2007   (AU) ............................... 2007209833

(51) Int. Cl.
*B60P 3/06* (2006.01)
(52) U.S. Cl.
USPC ............................................................ 410/3
(58) Field of Classification Search
USPC ............ 410/3, 4, 7–12, 19–21, 23, 30, 47–50
See application file for complete search history.

(56) References Cited

U.S. PATENT DOCUMENTS

| | | | |
|---|---|---|---|
| 1,990,582 A | 6/1931 | Otis | |
| 1,990,562 A * | 2/1935 | Otis | 410/67 |
| 4,960,353 A | 10/1990 | Thorndike | |
| 5,133,453 A | 7/1992 | Fritze | |
| 5,330,148 A | 7/1994 | Floyd | |
| 6,006,676 A | 12/1999 | Creek et al. | |
| 6,530,729 B2 * | 3/2003 | Tatina | 410/7 |
| 6,814,529 B2 | 11/2004 | Junge | |

FOREIGN PATENT DOCUMENTS

| | | |
|---|---|---|
| AU | 199712408 B2 | 10/1997 |
| EP | 0775608 A1 | 5/1997 |
| FR | 2400446 A1 | 3/1979 |
| FR | 7725620 A1 | 3/1979 |
| WO | WO2005/120897 A1 | 12/2005 |

OTHER PUBLICATIONS

Extended European Search Report, Nov. 3, 2011.

* cited by examiner

*Primary Examiner* — H Gutman
(74) *Attorney, Agent, or Firm* — Kilpatrick Townsend & Stockton LLP

(57) ABSTRACT

A restraint system that supports a motorcycle during transportation comprises a base (20), a rear frame (202) positioned on the base and operable to receive a rear wheel of the motorcycle, and a front frame (102) positioned on said base and operable to receive a front wheel of the motorcycle. The front frame has a linear range of movement relative to the base (20) to accommodate movement due to the suspension of the motorcycle. A first restraint assembly (150), in use, passes over the rear wheel and cooperates with said rear frame (202) to restrain the rear wheel in a vertical orientation relative to the base; and a second restraint assembly, in use, passes over the front wheel and restrains the front wheel relative to the front frame (102).

8 Claims, 9 Drawing Sheets

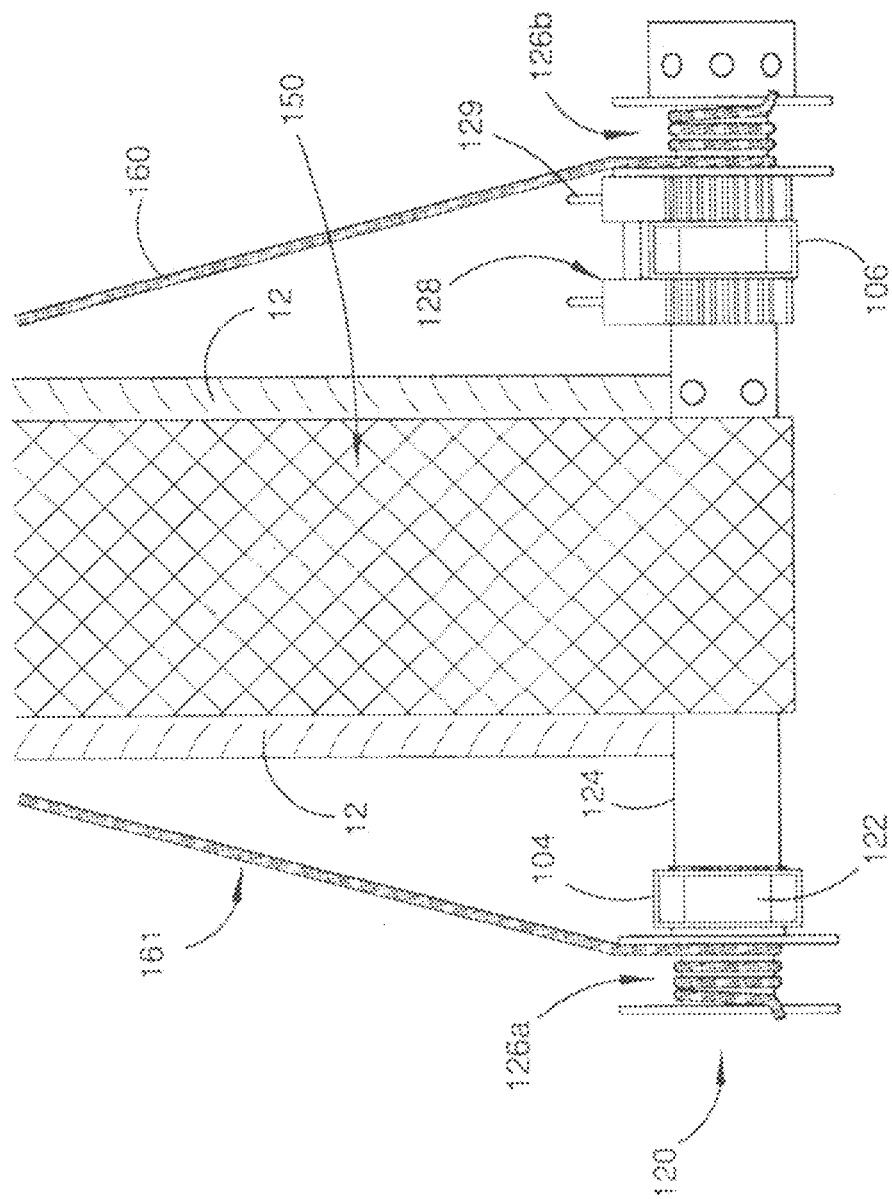

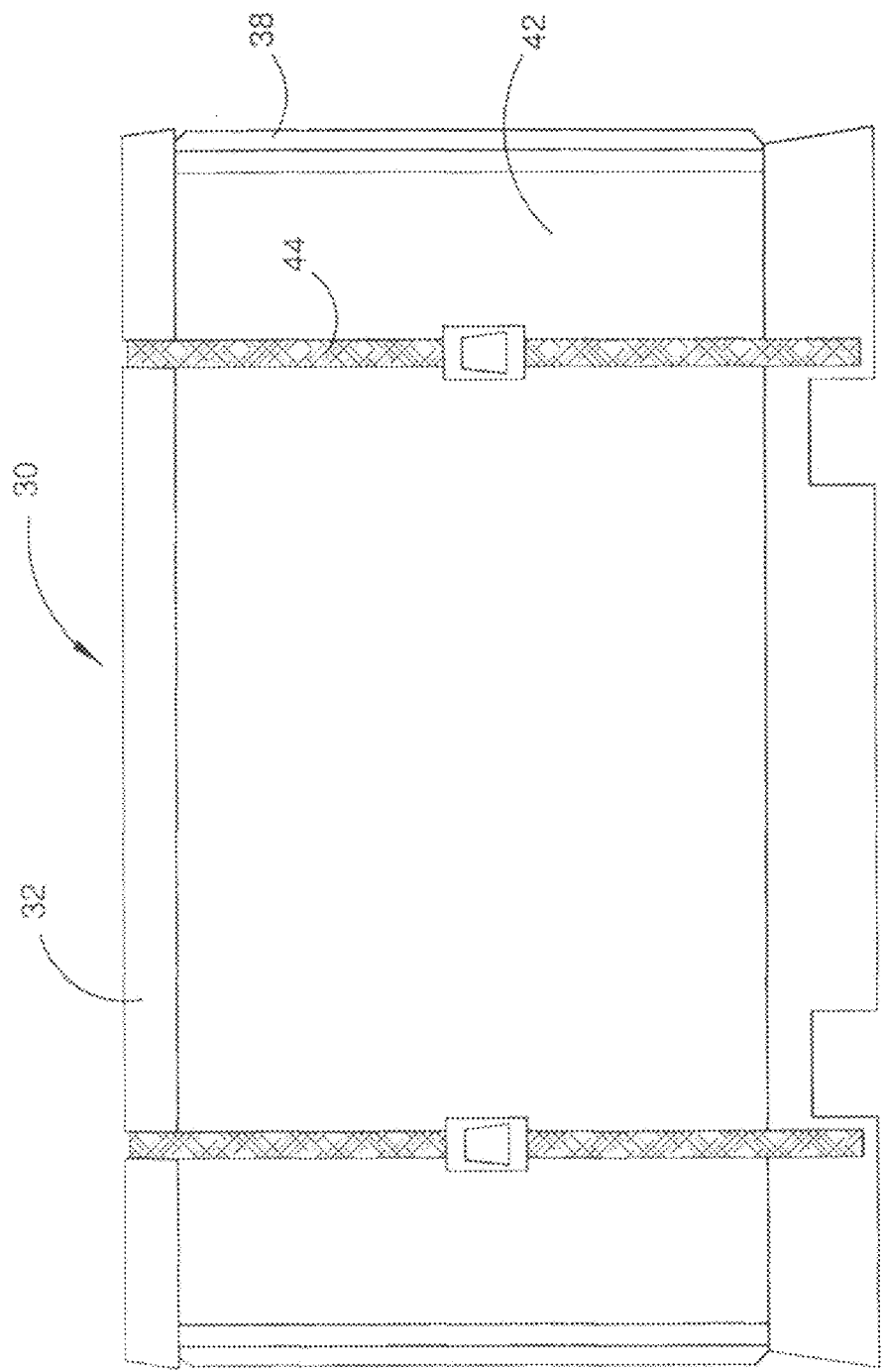

MOTORCYCLE TRANSPORTATION RESTRAINT SYSTEM

FIELD OF THE INVENTION

The present invention relates to a system for restraining and supporting motorcycles during transportation.

BACKGROUND OF THE INVENTION

For transportation from the factory to a distributor, motorcycles are generally conveyed using a support system specifically designed for the particular model of motorcycle. These customised supports may be made of steel or a combination of steel and cardboard. In general, the units are repacked after delivery and sent back to the factory of origin for reuse.

In some cases, for example when transporting a shipment of motorcycles between major centres, motorcycles may be transported by road in a special transporter vehicle. This is a relatively expensive option, as the transporter vehicle should be full or nearly full to make the costs viable.

If household goods are being relocated, a motorcycle is often a difficult item on the manifest. When motorcycles are transported singly or in small numbers, they are sometimes strapped to the side of a car carrier or similar vehicle. Motorcycles are occasionally transported in furniture vans, but this is often difficult due to the available loading height and the difficulty of securing the motorcycle within the van.

The motorcycles are easily dented or scratched, and parts and repairs are expensive. Strapping motorcycles down to the floor of a transporter is, at best, difficult as there are no ready attachment points. Rubbing and chafing of the motorcycle is likely, and plastic components may be damaged. A single scratch on a fuel tank or frame of a motorcycle may cost several thousand dollars to repair.

The existing options often make transportation of individual motorcycles troublesome, costly and possibly difficult to insure. There is an ongoing need for systems for holding motorcycles during transportation that are easy to use and limit potential damage to the motorcycles during relocation.

Discussions of prior art in the specification are not to be taken as an admission that the prior art is common general knowledge in Australia or any other jurisdiction.

SUMMARY OF THE INVENTION

It is an object of the present invention to substantially overcome or at least ameliorate one or more disadvantages of existing arrangements.

According to a first aspect of the invention there is provided a cycle support arrangement comprising:
a support structure having at least one support member adapted to receive and support a wheel of the cycle;
forward and rearward attachment points on the support structure forward and rearward of the support member;
a flexible elongate securement band attachable to the forward and rearward attachment points and adapted in use to pass over a wheel of a cycle which is located on said support member; and
tensioning means for applying a tension force to the securement band to pull the wheel downwardly against the support member and thereby secure the wheel and the cycle in a vertical orientation on the support structure.

Preferably the support structure comprises two support members adapted to receive respective wheels of the cycle, one of the support members being fixed relative to the support structure and the other support member being arranged to accommodate a range of linear movement.

According to a second aspect of the invention there is provided a restraint system for supporting a motorcycle during transportation, comprising:
a base;
a rear frame positioned on said base and operable to receive a rear wheel of the motorcycle;
a front frame positioned on said base and operable to receive a front wheel of the motorcycle, said front frame having a linear range of movement relative to said base;
a first restraint assembly that, in use, passes over the rear wheel and cooperates with said rear frame to restrain the rear wheel in a vertical orientation relative to said base;
a second restraint assembly that, in use, passes over the front wheel and restrains the front wheel relative to said front frame.

Preferably each of said first and second restraint assemblies comprises:
a flexible securement band that, in use, passes over the front or rear wheel respectively and is tightened to said front or rear frame respectively to restrain the wheel; and
a wire sling attachable to said front or rear frame respectively at a plurality of attachment points to tension said securement band against the front or rear wheel and provide vertical stability for the wheel.

Preferably said front frame and said rear frame each comprise a shaft assembly having:
a first shaft for receiving said securement band; and
a second shaft comprising the attachment points for said wire sling,
wherein said first and second shafts are independently rotatable to tighten said securement band and wire sling.

Preferably a suspension system of the motorcycle acts to vary a distance between the front wheel and the rear wheel and wherein in use said front frame moves linearly relative to said base and said rear frame dependent on the action of the suspension system.

The restraint system may comprise:
a capsule that in use is positioned on said base to enclose the motorcycle.

BRIEF DESCRIPTION OF THE DRAWINGS

An embodiment of the invention is described below with reference to the figures in which:

FIG. 9 shows a schematic end view of the wheel restraint assemblies of FIGS. 3 and 7; and FIG. 10 illustrates the capsule of FIG. 2 when strapped closed.

DETAILED DESCRIPTION OF THE EMBODIMENTS

The system described herein enables a motorcycle to be mounted on a support structure for transportation. One or both wheels of the motorcycle are strapped down to the support structure using a flexible elongate securement band that only touches the wheels of the motorcycle. There are no points of contact with the body of the motorcycle, and there is thus a reduced likelihood of damage to the motorcycle during transportation. The arrangement enables the transported motorcycle to use its own suspension system during relocation. Due to the design of typical motorcycle suspension, as the motorcycle moves up and down the wheelbase becomes longer and shorter. In one described arrangement the rear wheel of the motorcycle is strapped to a solid frame whilst the front wheel is strapped to a frame that is able to move linearly so that no undue strain or stress is put on the frame of the motorcycle during transportation.

Figure 1:
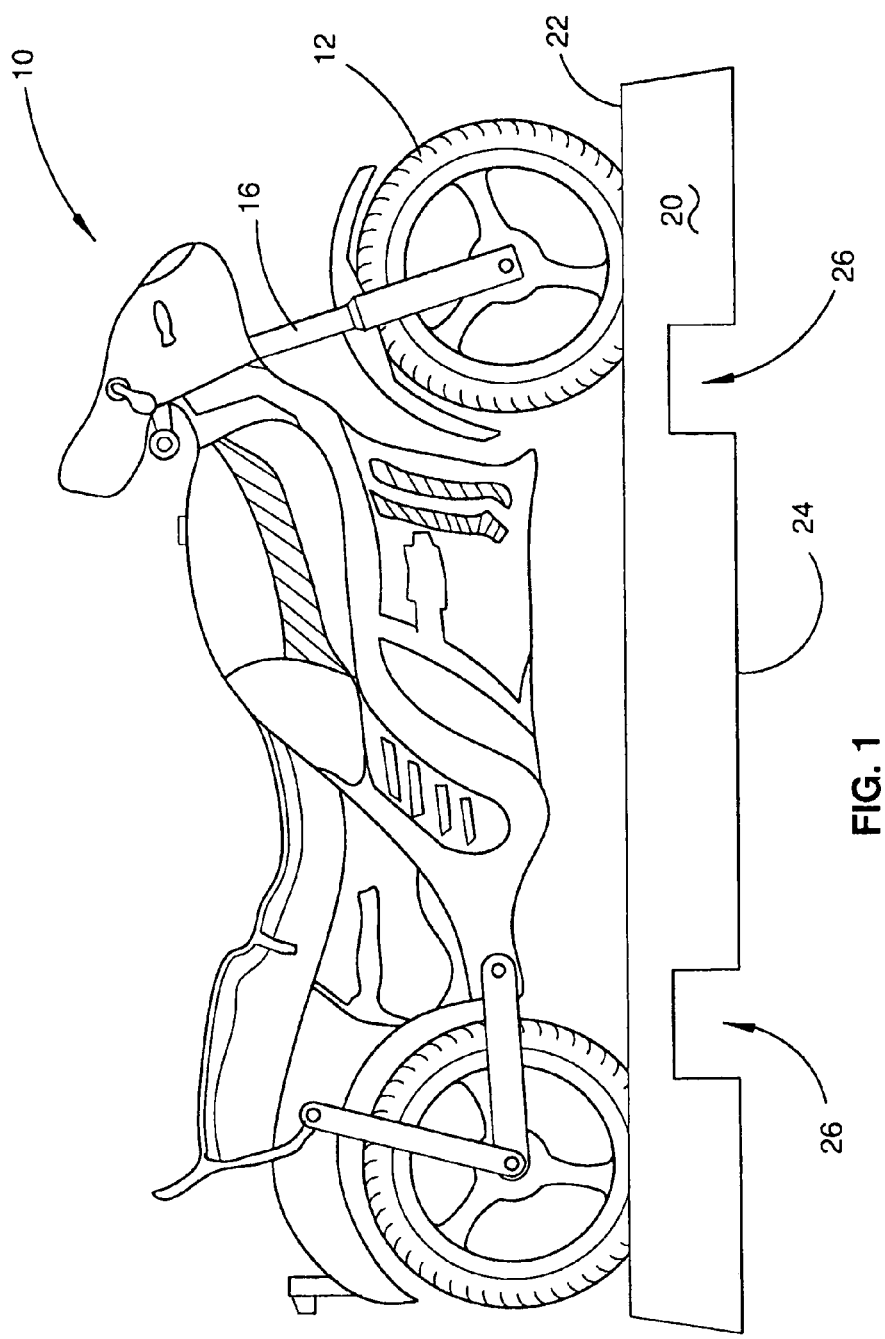
FIG. 1 illustrates a motorcycle positioned on a base for transportation.

FIG. 1 illustrates a motorcycle 10 mounted on a fibreglass base 20. As described in more detail below, two steel frames are mounted on a top surface 22 of the base 20 to restrain a front wheel 12 and rear wheel 14 of the motorcycle 10. The frame holding the front wheel 12 is able to slide backwards and forwards in a direction generally parallel to the length of the motorcycle 10. Due to this linear sliding motion, the suspension system in the fork 16 of the motorcycle 10 can function during movement of the mounted motorcycle.

At least two recesses 26 are formed in the lower surface 24 of the base 20, making the base 20 forklift compatible.

Figure 2:
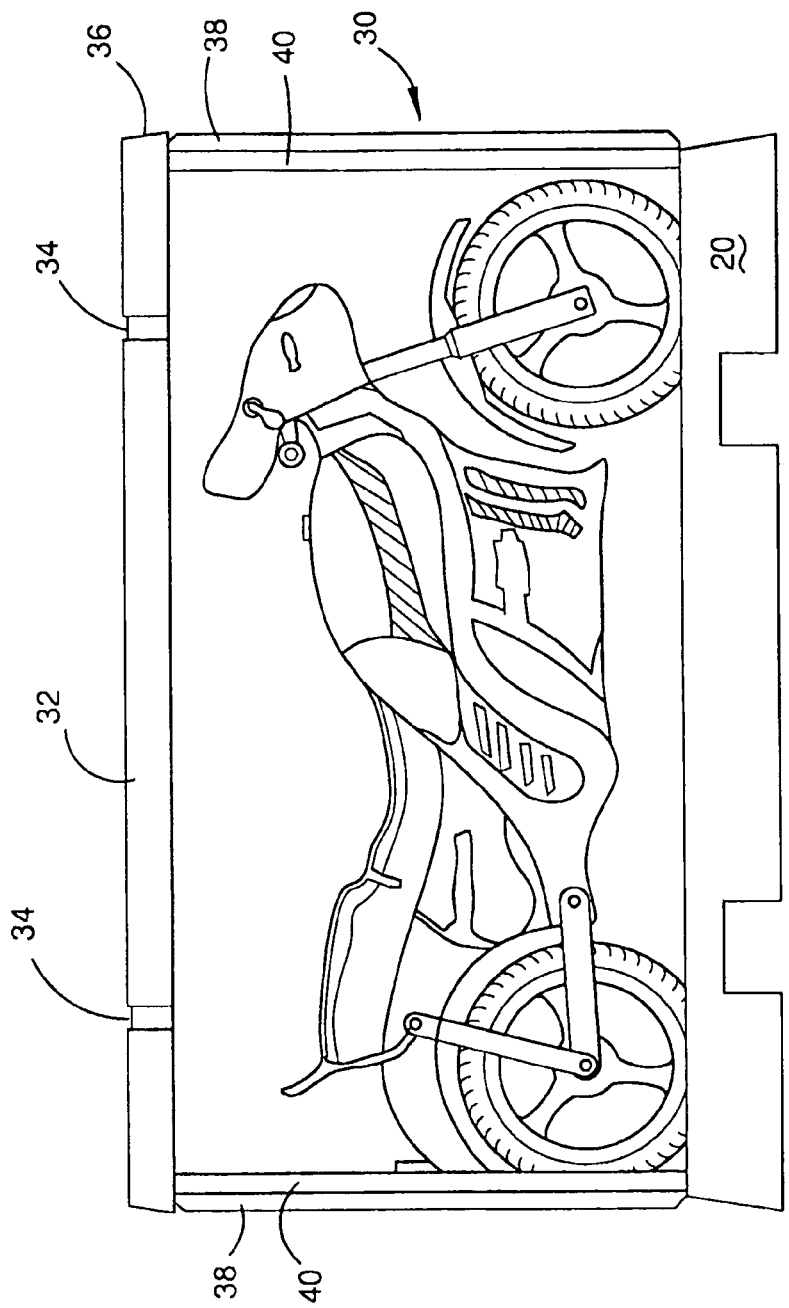
FIG. 2 shows the motorcycle of FIG. 1 partially enclosed by a capsule for transportation.

When the motorcycle 10 has been mounted on the base 20, four aluminium extruded corner posts 40 may be placed at each corner of the base 20. As illustrated in FIG. 2, two end panels 38 may be slid into place, supported by the corner posts 40 and the base 20. As shown in FIG. 10, two flat fibreglass side panels 42 may also be slid into place, supported by the corner posts 40 and the base 20. A lid 32 may then be placed on the side panels and end panels, enclosing the motorcycle 10 and forming a capsule 30 that may be transported as general freight on modes of transport including trucks, road trains or rail.

The lid 32 has at least two recesses 34 to accommodate 2,500 kg web straps 44 for tightening around the capsule 30. The capsule 30 may be manufactured using standard shipping dimensions, eg two pallets long by one pallet wide, for convenience of packing and transport. In the described embodiment, the capsules may be stacked two high. The components of the capsule 30 are designed to be flat-packed on top of one another for inexpensive transportation when no motorcycle is enclosed. Thus after use the components of the capsule 30 may be returned to a central depot for re-use.

Figure 6:
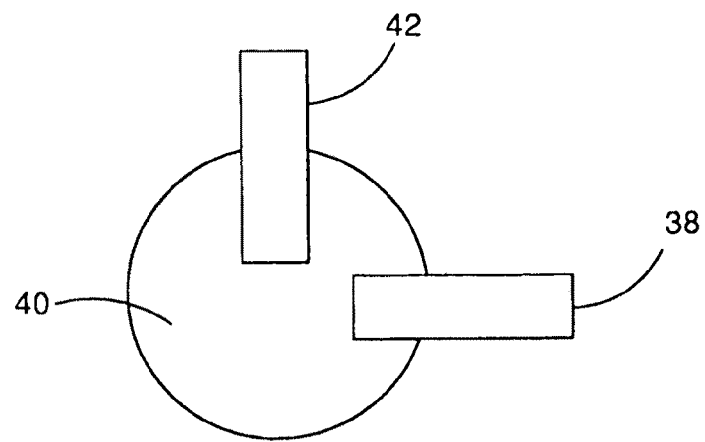
FIG. 6 shows a plan view of a support column for use in the capsule of FIG. 2.

FIG. 6 illustrates a configuration for the four aluminium extruded corner posts 40 used in the capsule 30. A cross-section view of the corner post 40 is shown. The post has a generally circular shape, with two slots formed therein. The end panel 38 and side panel 42 may be positioned in corresponding slots, holding the end panel and side panel in position relative to one another. The corner post 40 is mounted at each corner of the fibreglass base 20.

Figure 3:
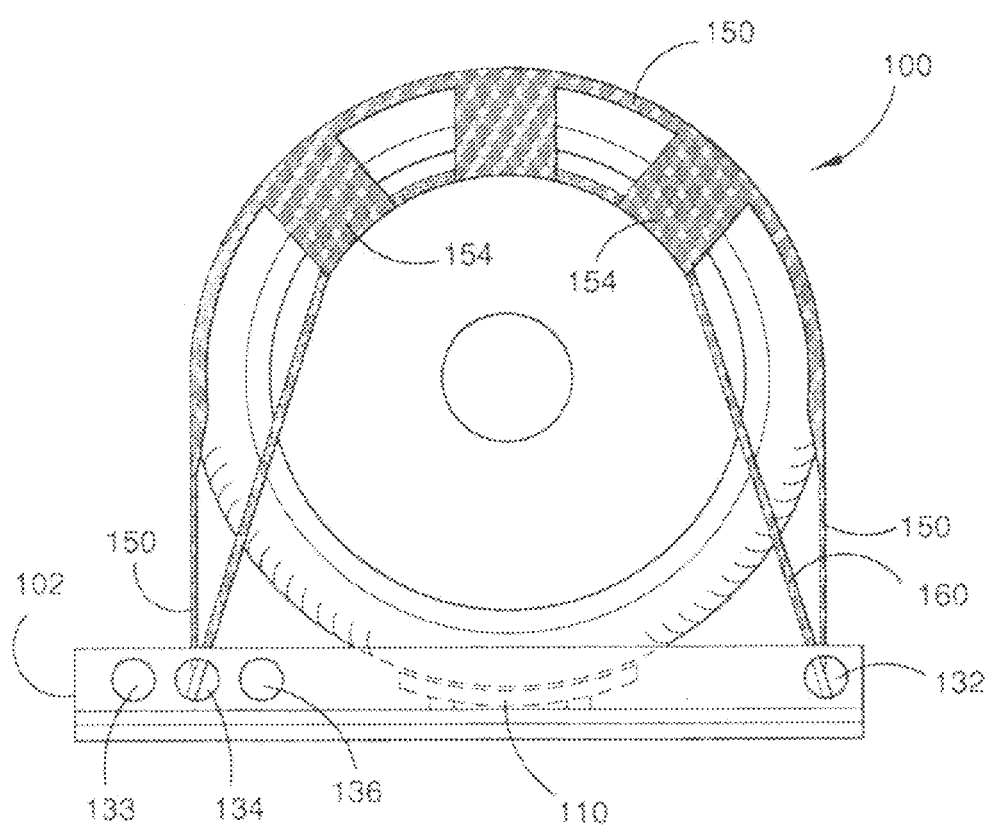
FIG. 3 shows a restraint assembly for holding the front wheel of the motorcycle to the base of FIG. 1.

FIG. 3 shows a wheel restraint assembly 100 used to restrain the front wheel 12 of the motorcycle 10. The arrangement includes a steel frame 102 that is mounted on the base 20 to act as a support structure for the motorcycle. The frame 102 includes a cradle 110, shown in dashed outline, that is shaped to receive the wheel 12. Holes 132, 133, 134, 136 are formed in the frame 102. As described below with reference to FIGS. 4A and 4B, a first shaft is positioned in hole 132 and a shaft assembly 120 is positioned in one of holes 133, 134, 136.

A flexible restraint assembly that includes an elongate securement band and a wire sling co-operates with the frame 102 to hold the wheel 12 in place. A securement band or webbing 150 is attached to the shaft 112 positioned through hole 132. In use, the webbing 150 is drawn over the upper surface of the front wheel 12 and attached to the shaft 120 positioned in the selected hole 134. The frame thus has attachment points forward and rearward of the wheel for the webbing 150. The webbing 150 is winched tight to hold the front wheel 12 in place.

The webbing 150 includes a number of cross straps 154 that in use are held against the side walls of the wheel 12. In the depicted embodiment, the webbing 150 includes three cross straps 154 but it will be understood that other configurations may be used.

A sheathed cable 160 is securely attached to the shaft 112 positioned in hole 132. The cable 160 passes through sleeves formed in each of the side straps 154 and, in use, is attached to the shaft assembly 120 passing through hole 134. Once the webbing 150 and cable 160 are in place (together with a corresponding cable 161 on the opposite side of the assembly 100), the cables are winched tight around shaft assembly 120. The cable sling formed by cables 160 and 161 cooperates with the webbing 150 to hold the front wheel 12 upright on the frame 102 and base 20.

Figure 4A:
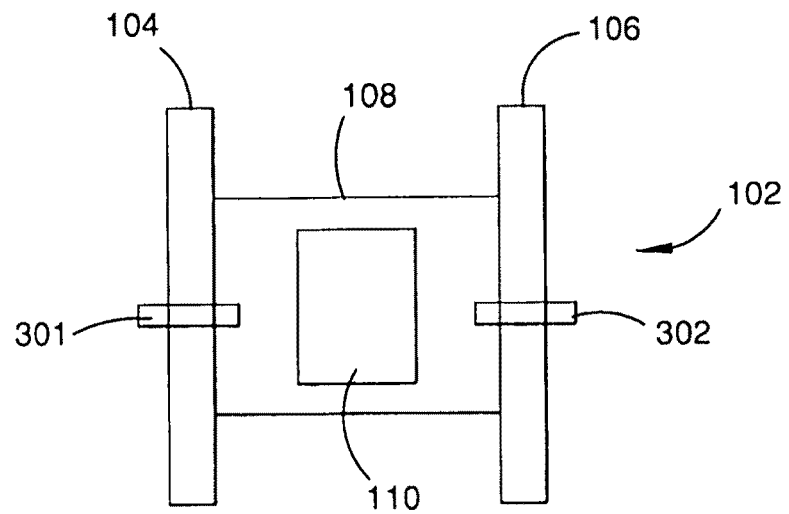
FIG. 4A is a schematic diagram of a frame for use with the restraint assembly of FIG. 3.

FIG. 4A shows, schematically, a top view of the frame 102. The frame 102 includes two elongate members 104, 106 that, in use, are positioned substantially parallel to the long axis of motorcycle 10. A plate 108 is positioned between the elongate members 104, 106, forming an H-shaped structure. The cradle 110 is formed on the plate 108. Thus, when the wheel 12 is positioned on the cradle 110, the elongate members 104, 106 are positioned on either side of the wheel 12.

Figure 4B:
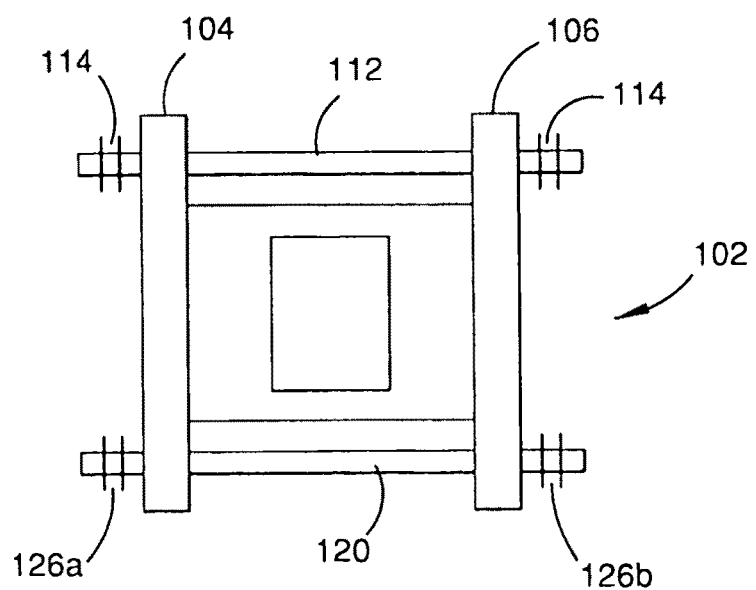
FIG. 4B shows the position of shafts mounted on the frame of FIG. 4A to hold a webbing and wire sling to retain a wheel of the motorcycle.

FIG. 4B illustrates the position of the shafts 112 and 120 that support the webbing 150 and wire sling formed by cables 160 and 161. Shaft 112 is positioned in hole 132 formed in elongate member 106 and a corresponding hole formed in elongate member 104. Anchor points 114 are formed at or near each end of the shaft 112 to hold cables 160, 161 respectively. The anchor points 114 are formed sufficiently far apart from one another to enable the motorcycle 10 to be held in a stable upright position in use. In one arrangement the distance between anchor points 114 is between 400 mm and 450 mm.

The shaft assembly 120, described in more detail below with reference to FIG. 9, passes through one of the holes 133, 134, 136 formed at an opposite end of elongate member 106 to hole 132. Multiple holes 133-136 are provided to accommodate for differences in size of the front wheel 12. A choice of three holes is shown in the depicted embodiment. However, it will be understood that a different number of holes may be provided.

In use, the webbing 150 and cables 160, 161 pass over the front wheel 12 positioned on cradle 110 and are attached to shaft assembly 120 and winched tight. The shaft assembly 120 includes two cable winch drums 126a and 126b to receive the cables 160, 161 respectively. In one arrangement the distance between the cable winch drums 126a and 126b is between 400 and 450 mm.

Figure 5:
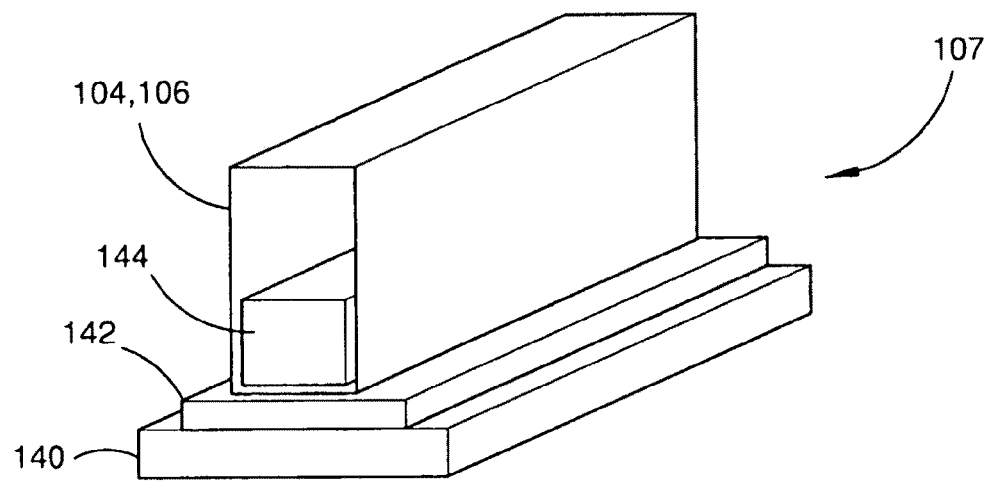
FIG. 5 shows components of the frame of FIG. 4A.

FIG. 5 shows in further detail some elements of the frame 102. The arrangement of FIG. 5 is used with each of the elongate members 104, 106. A rectangular metal plate 140 is securely attached to the fibreglass base 20. In one arrangement the metal plate 140 is secured to the base 20 using eight 10 mm bolts having associated nuts and washers.

A rectangular strip 142 is positioned on top of the rectangular plate 140. The strip 142 has substantially the same length as the plate 140 but is narrower. The strip may be formed of nylon, although other materials such as polyurethane may be used provided the elongate member 104, 106 can slide relative to the strip 142.

The elongate member 104, 106 is positioned on top of the rectangular strip 142. The elongate member 104, 106 has a hollow rectangular cross section, and a metal bar 144 is positioned in the hollow interior or the elongate member 104, 106. The bar 144, elongate member 104 or 106, rectangular strip 142 and metal plate 140 may all have substantially the same length.

The arrangement 107 shown in FIG. 5 is assembled such that the plate 140, strip 142 and metal bar 144 are fixed relative to one another. The elongate member 104, 106 is, however, able to move linearly relative to the bar 144 and rectangular strip 142. To accommodate this movement, at least one slot is formed in a lower surface of the elongate member 104, 106. The lower surface having the slots is, in use, positioned between the metal bar 144 and the rectangular strip 142. One or more bolts pass through the metal plate 140, rectangular strip 142 and metal bar 144, holding the three components together. Each bolt passes through a corresponding slot in the elongate member 104, 106. The length of the slots in the members 104, 106 defines the range of linear movement available. In one arrangement the slots are 80 mm long, accommodating a range of movement of 40 mm forwards and backwards from a central, neutral position. Initial tests indicate that this length matches the changes in wheelbase length due to the action of the motorcycle suspension. It will, however, be understood that a different length of slot may be used, for example if the length of the motorcycle varies by more than 80 mm.

The webbing 150 and wire sling made up of cables 160, 161 are attached to shafts passing through the elongate members 104, 106. Thus, as the elongate member 104, 106 slides forwards and backwards, the webbing 150 and cables 160, 161 also move, accommodating linear motion of the front wheel 12.

As seen in FIG. 5, the height of the elongate member 104, 106, is greater than the height of the metal bar 144 positioned therein. The space between the top of the metal bar 144 and the top surface of the top member 104, 106 is large enough to accommodate the shaft 112 and shaft assembly 120 that pass through one of the holes 132-136 formed in the sides of elongate member 104, 106.

Other arrangements enabling linear movement may be used in the assembly that holds the front wheel. For example, a linear rolling system using needle rollers or nylon wheels may be used.

Figure 7:
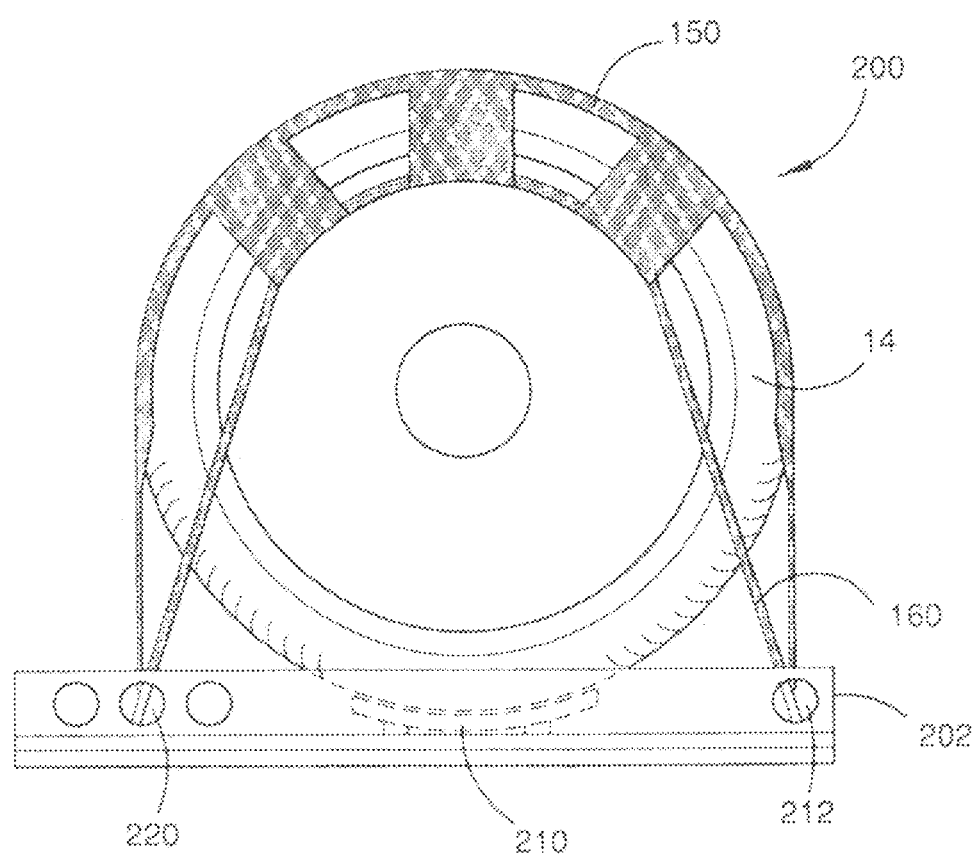
FIG. 7 shows a wheel restraint assembly for holding a rear wheel of the motorcycle to the base of FIG. 1.

FIG. 7 shows the wheel restraint assembly 200 used to restrain the rear wheel 14 of motorcycle 10 on the base 20. The assembly 200 is similar to restraint assembly 100 used for the front wheel, except that the supporting frame 202 is fixed and does not enable linear movement of the rear wheel 14 relative to the base. The frame 202 includes a cradle 210 shaped to accommodate the rear wheel 14. The configuration of the frame 202 and cradle 210 is similar to that shown in FIG. 4A. The frame 202 may also use an arrangement similar to assembly 107 shown in FIG. 5. However, in the case of frame 202, the elongate members corresponding to members 104 and 106 are fixed in position relative to the rectangular plate 140. The rectangular strip 142 and metal bar 144 are not required and the elongate members 104, 106 may be attached directly to the rectangular plate 140, for example by welding.

Since there is no need to accommodate for linear motion of the elongate members, the elongate members in frame 202 do not require extended slots in their operatively lower surface.

A flexible restraint assembly including webbing 150 and a wire sling made up of cables 160, 161 may be used in cooperation with the frame 202 to hold the rear wheel in place. The webbing 150 and cable 160 are attached to a shaft passing through hole 212. The webbing and cable are, in use, passed over the top surface of rear wheel 14 and attached to a shaft assembly positioned through a selected hole formed in frame 202, for example hole 220. The webbing 150 and cables 160 are winched tight to hold the rear wheel 14 in place relative to frame 202. The cables are attached to the frame at a plurality of attachment points to provide vertical stability of the wheel in use.

Figure 8:
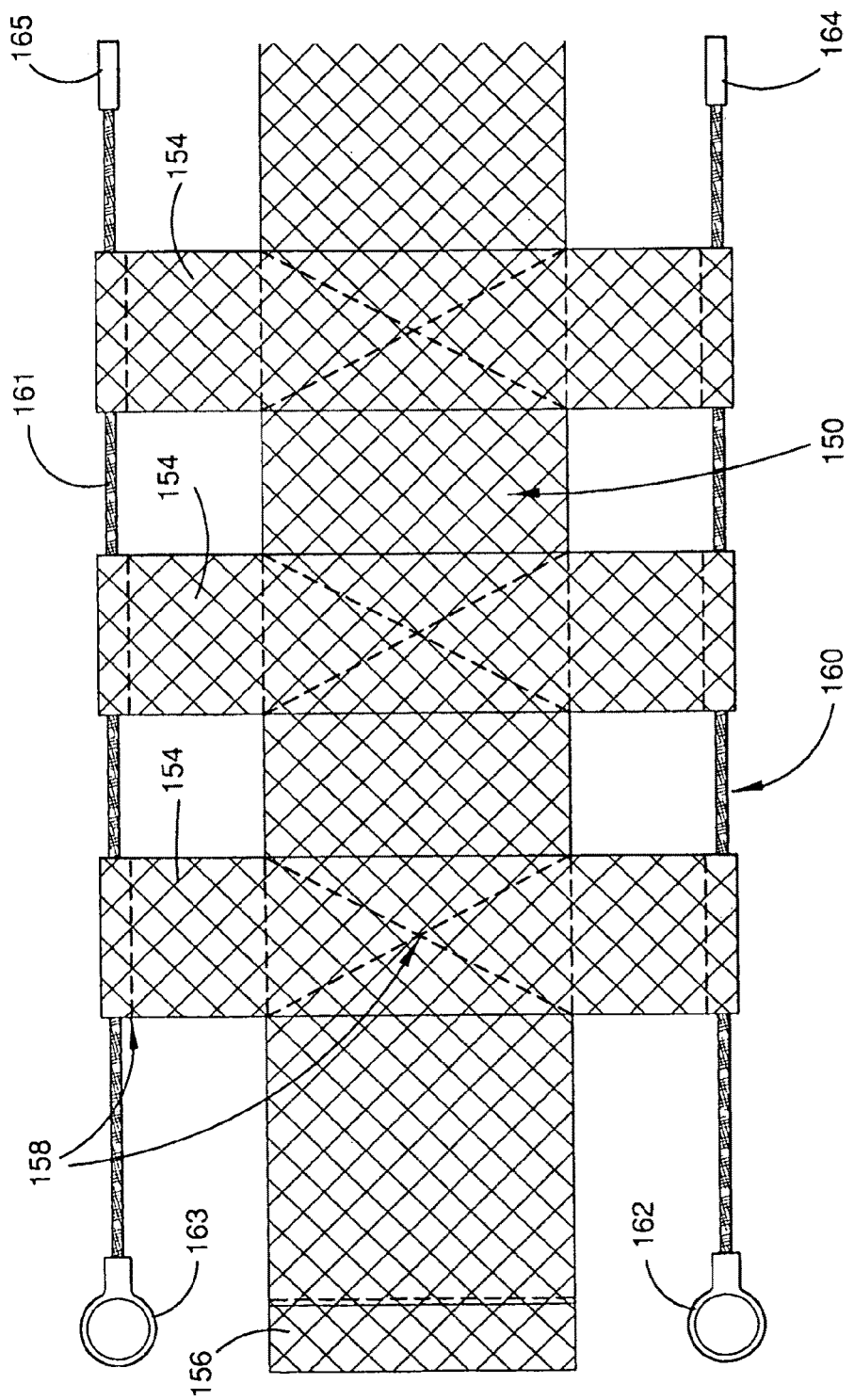
FIG. 8 shows a webbing and wire sling for use in the wheel restraint assemblies of FIGS. 3 and 7.

A suitable arrangement of webbing and wire sling is shown in FIG. 8. The main body of the webbing 150 is generally rectangular in shape and has a width that generally corresponds to the width of a tread of wheels 12, 14. The length of the rectangular portion of webbing 150 is sufficiently long to extend from shaft 112 over the top of rear wheel 14 or front wheel 12 to reach shaft assembly 120. The webbing 150 is winched around shaft assembly 120 to be tightened.

A sleeve 156 may be stitched at one end of the webbing 150, the sleeve 156 being large enough to accommodate the shaft 112 and hold the webbing 150 securely to shaft 112.

A number of cross bands 154 are stitched to the webbing 150, using industrial stitching 158. In the depicted arrangement there are three cross bands 154. Each of the bands 154 has a generally rectangular shape, and is positioned transverse to the length of webbing 150. Alternatively, the cross bands may be integrally formed with the main section of webbing 150. In use, and as seen in FIGS. 3 and 7, the cross bands 154 are positioned over a top surface of the wheel 12, 14 and down the side walls of the wheel 12, 14.

At the ends of the cross bands 154 remote from the main body of the webbing 150, sleeves are stitched to accommodate cables 160, 161 respectively. In use, the cables 160, 161 pull the cross bands 154 down the side walls of the wheel 12, 14, holding the webbing 150 firmly in place on the wheel 12, 14. In one arrangement, cable 160 has a terminal ring 162 and cable 161 has a terminal ring 163. The rings 162, 163 are attached to shaft 112 at anchor points 114. The respective opposite ends 164, 165 of cables 160, 161 are, in use, attached to shaft assembly 120. For example, end 164 may be winched around winch drum 126b to be tightened and end 165 may be winched around winch drum 126a to tighten the webbing 150 around the wheel 12, 14.

FIG. 9 shows a schematic end view of the wheel restraint assemblies 100, 200 in use. The numbering scheme used relates to the front wheel assembly 100 used to retain front wheel 12. However, the arrangement shown may also be used in the rear wheel restraint assembly 200.

The shaft assembly 120 includes two co-axially positioned shafts 122, 124. Shaft 122 is positioned within shaft 124. The two shafts 122, 124 may be rotated independently. The external shaft 124 is used to hold and tighten the webbing 150. The internal shaft 122 is used to hold and tighten the cables 160, 161. Cable winch drums 126a and 126b are provided on the internal shaft 122, which passes through each of the extended members 104, 106. FIG. 9 does not show the metal bar 144 positioned inside the extended members 104, 106. However, it will be understand that there is sufficient clearance within the extended members 104, 106 to accommodate both the internal shaft 122 and the metal bar 144.

Positive locking mechanisms 128, 129 are provided on the shafts 122, 124 respectively. The positive locking mechanisms are independent, permitting the webbing 150 and cables 160, 161 to be winched tight separately. The shaft assembly 120 and wire sling provide a tensioning means for applying a tensioning force to the webbing 150 to pull the wheel downwardly against the frame and thereby secure the wheel and motorcycle.

In one arrangement, the wire slings formed by cables 160, 161 have breaking strain totaling 3,200 kg. The metal cables may be sheathed.

In addition to the webbing and wire sling, clamps on the frames 102, 202 may clamp wheels 12, 14 for added stability. For example, threaded cylindrical tubes 301, 302 may be mounted on each of the elongate members 104, 106 generally opposite the cradle 110. Screws each supporting a clamp may be tightened in the tubes 301, 302, pressing the clamps to either side of the wheel 12, 14 and limiting lateral movement of the wheel in use.

In an alternative arrangement the motorcycle is secured using only the rear frame and restraint. The front wheel is allowed to move linearly forward and backward. A guide may be provided to limit rotation of the front wheel.

In other arrangements, the motorcycle restraint system is mounted directly in a vehicle rather than being used in a freight capsule 30. For example, the restraint system may be fitted with a cover that is removed when it is necessary to transport a cycle in the vehicle. The webbing and wire sling may be stored adjacent the frame or frames of the restraint system. Alternatively, the webbing and wire sling may be stored elsewhere until required. The vehicle may, for example, be a furniture removal van that can be used to securely transport a motorcycle when required. The van may provide a single support structure to hold the rear wheel; or may additionally provide a second support structure capable of limited linear movement to support the front wheel of the cycle.

The restraint assemblies may be provided in various sizes, where each particular size is designed to accommodate a range of motorcycles. The dimensions of the assemblies are generally increased to accommodate larger types of motorcycle.

The described arrangements advantageously provide a means of restraining a motorcycle in position during transportation. The restraint system is not customised for any particular type of motorcycle and may thus be used with a wide range of motorcycles. The restraint system only contacts the wheels of the motorcycle and thus limits the chance of damage to the motorcycle during relocation. The described arrangements accommodate movement of the motorcycle's suspension system and thus it is not necessary to clamp down the suspension during transportation.

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

The claims defining the invention are as follows:

1. A cycle support arrangement comprising:
   a support structure having:
     a fixed part; and
     a support member linearly movable relative to the fixed part, said support member being configured to receive and support a wheel of a cycle wherein, when in use to support the cycle during transportation, the support member provides linear movement for the wheel relative to the fixed part;
   forward and rearward attachment points on the support structure forward and rearward of the support member;
   a flexible elongate securement band attachable to the forward and rearward attachment points to secure the cycle to the support member by passing over the wheel of the cycle when located on said support member; and
   a tensioning arrangement for applying a tension force to the securement band to pull the wheel downwardly against the support member and thereby secure the wheel and the cycle in a vertical orientation on the support structure,
   wherein the support structure accommodates movement of the cycle's suspension system and during transportation said support member moves linearly relative to the fixed part dependent on the action of the suspension system.

2. A cycle support arrangement according to claim 1 comprising a second support member adapted to receive a second wheel of the cycle, the second support member being fixed relative to the support structure.

3. A restraint system for supporting a motorcycle during transportation, comprising:
   a base;
   a rear frame positioned on said base and operable to receive a rear wheel of the motorcycle;
   a front frame positioned on said base and operable to receive a front wheel of the motorcycle, said front frame linearly moveable relative to said base during transportation;
   a first restraint assembly passing over the rear wheel and cooperating with said rear frame to restrain the rear wheel in a vertical orientation relative to said base;
   a second restraint assembly passing over the front wheel and restraining the front wheel relative to said front frame,
   wherein action of a suspension system of the motorcycle varies a distance between the front wheel and the rear wheel and wherein in use said front frame moves linearly relative to said base and said rear frame dependent on the action of the suspension system.

4. A restraint system according to claim 3 wherein each of said first and second restraint assemblies comprises:
   a flexible securement band that, in use, passes over the front or rear wheel respectively and is tightened to said front or rear frame respectively to restrain the wheel; and
   a wire sling attachable to said front or rear frame respectively at a plurality of attachment points to tension said securement band against the front or rear wheel and provide vertical stability for the wheel.

5. A restraint system according to claim 4 wherein said front frame and said rear frame each comprise a shaft assembly having:
   a first shall for receiving said securement band; and
   a second shaft comprising the attachment points for said wire sling, wherein said first and second shafts are independently rotatable to tighten said securement band and wire sling.

6. A restraint system according to claim 3 comprising:
   a capsule that in use is positioned on said base to enclose the motorcycle.

7. A restraint system according to claim 3 wherein said front frame comprises:

a hollow elongate member having one or more slots defined in a surface that, in use, faces said base;

a bar positioned within said hollow elongate member and fixed relative to said base through said one or more slots wherein, during transportation of the motorcycle, said hollow elongate member has linear movement to and fro relative to said bar.

8. A vehicle for transporting a motorcycle comprising the restraint system of claim 3.

* * * * *